Sept. 13, 1927.
R. KRAUSE
1,642,247
MOLDING DEVICE FOR MAKING CONCRETE BLOCKS
Filed Nov. 5, 1924
2 Sheets-Sheet 1
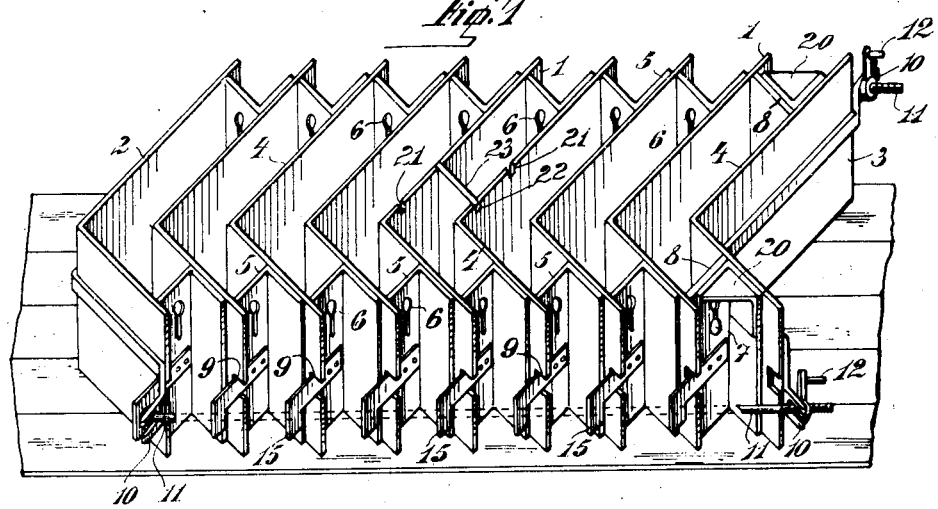
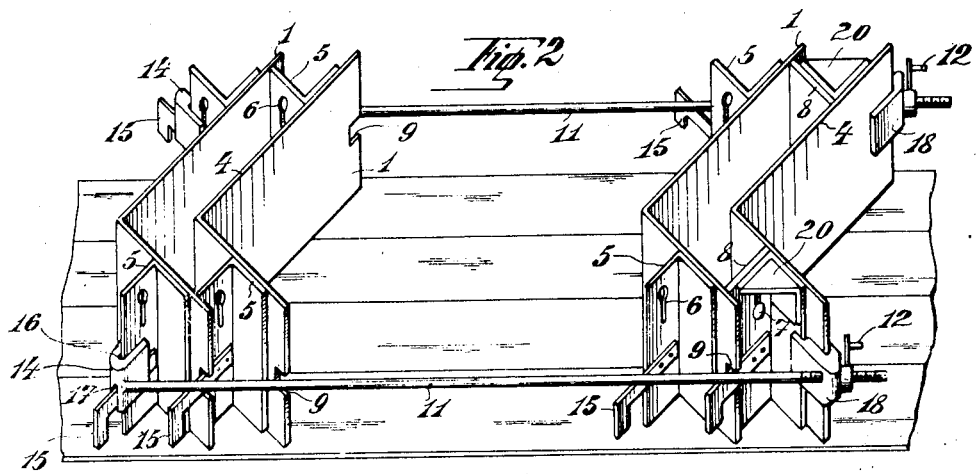
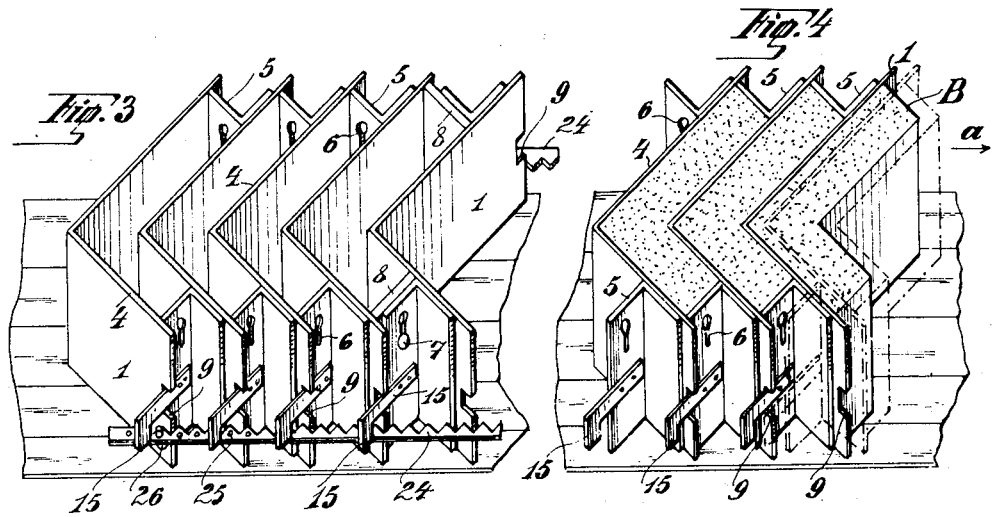
Inventor
R. Krause
By Marker Clark Sept. 13, 1927.  R. KRAUSE  1,642,247
MOLDING DEVICE FOR MAKING CONCRETE BLOCKS
Filed Nov. 5, 1924   2 Sheets-Sheet 2
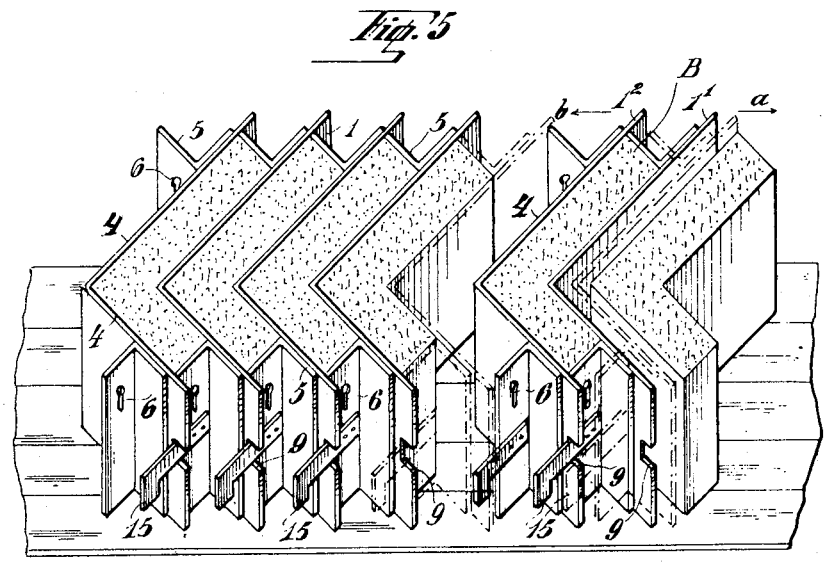

Patented Sept. 13, 1927.

1,642,247

UNITED STATES PATENT OFFICE.

RUDOLF KRAUSE, OF VIENNA, AUSTRIA.

MOLDING DEVICE FOR MAKING CONCRETE BLOCKS.

Application filed November 5, 1924, Serial No. 747,964, and in Austria March 22, 1923.

This invention relates to the manufacture of concrete blocks to be used in building, especially blocks of angular shape, and to a device for making same, which device consists of a plurality of elements forming the molds for the blocks.

The invention aims at improving these elements so that blocks of different thickness can be made therewith, that assembling the elements to a molding device allowing a number of blocks to be produced simultaneously, can be easily effected and that a reliable connection (fastening) of the elements is assured, which surely prevents loosening of the elements or of parts thereof during operation. A further object of the invention is an improvement forcing the operator to proceed in such manner, that deterioration of the blocks by removing the elements is prevented. Finally the invention also offers the advantage, that the elements, although being simple, strong and durable, can be made at relatively low costs.

For obtaining these advantages according to the present invention those walls of each single mold or element, to which the end faces of the blocks to be made will apply, are made so as to allow interchangeable pieces or walls to be fastened thereon. According to the invention these end-walls are firmly (rigidly) secured to the outer surface of the plates or walls on which the longer (side-) surfaces of the block are formed, (hereinafter called the side-walls). This manner of securing the endplates to the side walls offers the advantage, that the elements can be manufactured at reduced costs and that withdrawal of the element from the blocks is facilitated. The connection or fastening of the elements so as to form, when united, a rigid body is effected by means of the handles of each element, these handles having such form as to engage with slots or notches of the adjacent element, and furthermore by means of clamping rods connecting the outer elements, that is to say the first and the last one.

Further features of the invention will be described with reference to the drawing, in which Fig. 1 shows a perspective view of the entire molding device containing a number of assembled elements for producing angular blocks, Fig. 2 a similar view of a device for connecting the end elements together, and Fig. 3 another form of the last mentioned device.

Figs. 4 and 5 show the position of the parts when arranged for withdrawing one element from a block already rammed (beaten down).

The combined device as shown in Fig. 1 is composed of a number of elements 1, all of which are perfectly alike excepting the end elements 2 and 3. Each element consists of a plate 4 bent angularly and constituting the side wall, and corner irons or angularly bent plates 5, the one side or leg of which is rigidly secured to the plate 4 by welding, by means of rivets or in any other convenient manner. The other part of the bent plate 5, extending at an angle, mostly at right angle from the plate 4, thus forming the end wall, is provided with a handle 15 and with an aperture 6. The latter is composed of a circular hole and of a slot combined therewith so as to allow the rivet head 7 of an interchangeable piece 8 to engage therewith, if blocks are to be made, the thickness of which ought to exceed the breadth of the normal end plate. At the lateral edges of the side plates 4 notches 9 are provided in order to take up the handles 15 of the adjacent element. The end elements 2 and 3 possess guiding forks 10, into which the partly threaded clamping rod 11 can be inserted side-wise. The nut of the screw formed by the end of the clamping rod is provided with a lever 12 and with a handle, thus allowing the elements to be clamped by turning the handle.

For assembling the elements, to begin with either of the end elements 2 or 3, they are simply placed side by side so that the handles 15 of each element will engage with the notches 9 of the adjacent element. Then the end elements are connected by means of the rod 11 and all the elements clamped together by turning the said nut. Concrete is filled into the molds and beaten down (rammed). In order to prevent some of the concrete to fall outside of the molds plates 20 may be provided at the upper edge of the end plates.

If besides angular blocks also prismatic blocks ought to be made, a division plate 23 may be inserted into the space of the angular mold, so that between the end plate and said division plate a prismatic space is created. For fastening these division plates to the side plates 4, the latter may be provided on their upper edge and if desired also on their lower one with notches 21 adapted to engage with conveniently formed extensions 22 of the division plates.

Fig. 2 shows an embodiment of the mold allowing to use uniform elements throughout so as to dispense with special forms of elements to be used at the ends of the entire device. For this purpose the head 14 of the partly threaded clamping rod 11 is provided with a slot 16 engaging with the end plate of the last element and with another slot 17 engaging with its handle. The nut of the clamping rod presses against a bracket, block or plate 18 provided with a slot by means of which this block 18 is held on the edge of the side plate of the last element. The clamping rod passes freely through a hole of the bracket 18 and rests on the handles 15 of all the elements, thus keeping the entire clamping device in position.

Another way of connecting the end elements is shown in Fig. 3. A flat rail 24 is near to its end provided with a number of holes 25 engaging with tenons or bolts 26 of the end elements. The inner edge of the rail is toothed so that the lateral edges of the side plates 4 will engage with one of the spaces between the angular teeth. The pitch of toothing is chosen such that said edges will also engage with one of the tooth spaces, if interchangeable pieces are mounted on the endplates for making blocks of varying thickness.

For taking apart the elements first of all the clamping rods 11 are dismounted, then element 3 is pulled so as to slide on the baseboard and is removed. Now the first block B only reclines upon the inner surface of the side plate of the next element (see Fig. 4). The operator grasps the handles 15 of this element and pulls the latter together with the block in the direction of the arrow $a$ so far that the handles disengage from the notches 9 of the third element. Thereafter the second element is lifted upward. Thereby the lateral edge of the third element will act as a guide for the handles 15, thus facilitating the lifting of the element and preventing any deterioration of the block.

If the device is to be dismounted immediately after the concrete has been beaten down, the proceeding is somewhat to be modified, as in such case the block which is only supported and protected on its one side is liable of being damaged when sliding on the base board. In order to prevent this drawback the sliding of the block B is carried out in such manner that both sides of it are covered and protected during the sliding by side plates, as is shown in Fig. 5. At the right hand side of this figure a block is shown, from which the protecting elements had already been withdrawn. The next block is also shown after having been pulled away from the body formed by the other blocks and elements. As is seen, this shifting movement has been effected with the one element ($1^1$) in front of the block and with the next ($1^2$) on its back, that is to say the first one protecting the inner face as well as the one surfaces and the other the outer face thereof. The first element ($1^1$) can now easily be removed by first pulling it in the direction of the arrow $a$ until the handles 15 will disengage from the notches 9 of the element ($1^2$) and then lifting it up. Thereafter the element ($1^2$) is shifted back so as to touch the inner face of the third block in order to protect this latter one and now the third block can be handled in the same manner as has just been described for the second one.

The elements progressively removed from the combined mold are united again to form another molding device, thus enabling of continuous operation with a respectively small number of elements.

In known elements for making angular blocks the end plates are fixed on the inner surface of the angular plate 4. If these end plates are rigidly secured to the side plates at their inner surface, damaging the block by lifting up the element cannot as a rule be avoided in practice. It is therefore necessary to secure the end plates to the side plates by means of knuckles and to turn the end plates outward before the element is lifted.

But if according to the present invention the end plates are disposed at the outer surface of the angular side plates, the knuckles can be dispensed with, as now the end plates do not touch anymore the end faces of the block, when the element is lifted. The elements are therefore by this arrangement rendered cheaper and disturbances which may result from the knuckles being jammed, are thus avoided. Furthermore the operation of taking the device to pieces is simplified. Also the particular manner of the handles being secured to the end plates is intended to avoid deterioration of the block, as the handles are disposed in the plan of said end plates.

I claim:

1. A molding device for making concrete blocks consisting of a plurality of elements with two flat end walls, both of which are rigidly secured to the same face of the side wall so as to extend in divergent directions, these flat end walls being adapted to removably fasten thereon interchangeable pieces, which are broader than the end plates for the purpose of varying the thickness of the blocks to be made.

2. A molding device for making blocks consisting of a plurality of elements with two flat end walls, both of which are rigidly secured to the same face of the side wall so as to extend in divergent directions, these flat end walls being provided with slots adapted to engage with tenons of interchangeable pieces for varying the breadth of the single molds.

3. A molding device for making concrete blocks consisting of a plurality of elements with two flat end walls, both of which are rigidly secured to the same face of the side wall so as to extend in divergent directions, and which are provided with handles serving for lifting up the element, these handles engaging with notches provided at the lateral edges of the side plates of the adjacent element.

4. A molding device for making concrete blocks consisting of a plurality of elements with two flat end walls, both of which are rigidly secured to the same face of the side wall so as to extend in divergent directions, the space between the upper edge of each end plate and of the protruding part of the side plate being covered by a plate preventing concrete from falling outside the molds.

5. A molding device for making concrete blocks consisting of a plurality of elements with two flat end walls, both of which are rigidly secured to the same face of the side wall so as to extend in divergent directions, and of rails having a number of holes adapted to engage with tenons of the end elements.

6. A molding device for making concrete blocks consisting of a plurality of elements with two flat end walls, both of which are rigidly secured to the same face of the side wall so as to extend in divergent directions, and of toothed rails having a number of holes, the lateral edges of the side plates of the elements engaging with the teeth of said rails.

In testimony whereof I have affixed my signature.

RUDOLF KRAUSE.